(12) United States Patent
Ding et al.

(10) Patent No.: US 11,554,675 B2
(45) Date of Patent: Jan. 17, 2023

(54) MAGLEV TRAIN AND MOVING PART THEREOF

(71) Applicant: CRRC QINGDAO SIFANG CO., LTD., Shandong (CN)

(72) Inventors: Sansan Ding, Shandong (CN); Fujie Jiang, Shandong (CN); Dalian Yu, Shandong (CN); Peng Liu, Shandong (CN); Xin Liang, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 401 days.

(21) Appl. No.: 16/644,515

(22) PCT Filed: May 4, 2018

(86) PCT No.: PCT/CN2018/085577
§ 371 (c)(1),
(2) Date: Mar. 5, 2020

(87) PCT Pub. No.: WO2019/062121
PCT Pub. Date: Apr. 4, 2019

(65) Prior Publication Data
US 2020/0290463 A1 Sep. 17, 2020

(30) Foreign Application Priority Data
Sep. 26, 2017 (CN) .......................... 201710884069.9

(51) Int. Cl.
*B60L 13/04* (2006.01)
*B61B 13/08* (2006.01)
(Continued)

(52) U.S. Cl.
CPC .............. *B60L 13/04* (2013.01); *B61B 13/08* (2013.01); *B60L 13/10* (2013.01); *B60L 2200/26* (2013.01); *B61F 5/24* (2013.01); *E01B 25/305* (2013.01)

(58) Field of Classification Search
CPC ...... B60L 13/04; B60L 13/10; B60L 2200/26; B61B 13/08; B61F 5/24
See application file for complete search history.

(56) References Cited

U.S. PATENT DOCUMENTS 4,953,470 A 9/1990 Yamaguchi

FOREIGN PATENT DOCUMENTS

| CN | 1799896 A | 7/2006 |
|---|---|---|
| CN | 101624054 A | 1/2010 |

(Continued)

OTHER PUBLICATIONS

International Search Report for PCT/CN2018/085577 dated Aug. 1, 2018, ISA/CN.

(Continued)

*Primary Examiner* — Robert J McGarry, Jr.
(74) *Attorney, Agent, or Firm* — Yue (Robert) Xu; Apex Attorneys at Law, LLP

(57) ABSTRACT

A moving part of a maglev train, comprising two levitation frames that are arranged at an interval along the direction of travel, the two levitation frames being connected by means of a vertical beam; a peripheral wall of the vertical beam provided with a slot that may reduce the torsional rigidity thereof, being capable of reducing the torsional rigidity of the traditional vertical beam so as to reduce the coupling effect between the two levitation frames that are connected by means of the vertical beam, thereby greatly reducing the difficulty and energy consumption of levitation control. The levitation frames and the train body are provided therebe- (Continued)

tween with a vertical shock absorber and a horizontal absorber having suitable damping values, the levitation frames and the train body are provided therebetween with horizontal stoppers and vertical stoppers which may prevent excessive horizontal movement, rollover and overturning.

18 Claims, 3 Drawing Sheets

(51) Int. Cl.
    *B60L 13/10*     (2006.01)
    *B61F 5/24*     (2006.01)
    *E01B 25/30*     (2006.01)

(56) References Cited

FOREIGN PATENT DOCUMENTS

| CN | 101934740 A | | 1/2011 |
|---|---|---|---|
| CN | 101934741 A | | 1/2011 |
| CN | 101954913 A | | 1/2011 |
| CN | 102975629 A | | 3/2013 |
| CN | 202863065 U | | 4/2013 |
| CN | 203126559 U | | 8/2013 |
| CN | 203766544 U | | 8/2014 |
| CN | 204895025 U | | 12/2015 |
| CN | 206317713 U | | 7/2017 |
| CN | 107791882 A | | 3/2018 |
| JP | H08168109 A | | 6/1996 |
| JP | 2007091039 A | * | 4/2007 |
| JP | 2009254099 A | * | 10/2009 |
| JP | 5877959 B2 | | 3/2016 |

OTHER PUBLICATIONS

CNIPA First Office Action corresponding to Application No. 201710884069.9; dated Mar. 7, 2019.

Han,Jingang et al. Research on Distortion Stiffness in 日-type Welded Frame of Freight Wagon, Railway Locomotive & car, vol. 29, No.(5), Oct. 31, 2009(Oct. 31, 2009), p. 39, right-hand column and figures 4-5.

\* cited by examiner

MAGLEV TRAIN AND MOVING PART THEREOF

The application is a National Phase entry of PCT Application No. PCT/CN2018/085577, filed on May 4, 2018, which claims the priority to Chinese patent application No. 201710884069.9 titled "MAGLEV TRAIN AND RUNNING GEAR THEREOF", filed with the China National Intellectual Property Administration on Sep. 26, 2017, which are incorporated herein by reference in their entireties.

FIELD

The present application relates to the technical field of maglev trains, and in particular to a maglev train and a running gear of the maglev train.

BACKGROUND

A maglev train usually includes a vehicle body and multiple running gears provided at the bottom of the vehicle body. The multiple running gears are mainly used for supporting the vehicle body, and the multiple running gears can transmit a suspension force, a guiding force, a traction force and a braking force to the vehicle body through a secondary suspension system, so as to ensure the maglev train to have the capability to smoothly travel in a horizontal curve, a torsion curve, or a vertical curve.

The above running gear generally includes two suspension frames spaced apart in a traveling direction, and the two suspension frames are connected by a longitudinal beam. Thus, when the train travels in an easement curve, a relative side-roll motion will be generated between the two suspension frames of the same running gear, which requires the longitudinal beam to have a certain torsional deformation capability.

In the conventional technology, the longitudinal beam is prepared from an aluminum profile having a rectangular cross section, and the aluminum profile has a large torsional rigidity. Due to the excessive torsional rigidity of the aluminum profile, the coupling effect between the two suspension frames is intensified, which in turn causes the train to generate additional energy consumption as the train travels in the easement curve and also increases the difficulty of suspension control.

Therefore, how to provide a running gear of a maglev train for reducing the torsional rigidity of the longitudinal beam is still a technical problem to be solved by those skilled in the art.

SUMMARY

One object of the present application is to provide a maglev train and a running gear of the maglev train. The running gear can reduce the torsional rigidity of the longitudinal beam to reduce the coupling effect between the two suspension frames connected through the longitudinal beam, thereby greatly reducing the difficulty and the energy consumption of the suspension control.

In order to solve the above technical problem, a running gear for a maglev train is provided according to the present application, which includes two suspension frames spaced apart in a traveling direction, a pulling rod for connecting the longitudinal beam and a vehicle body of the maglev train. The two suspension frames are connected through a longitudinal beam, and a slot for reducing a torsional rigidity of the longitudinal beam is provided on a circumferential wall of the longitudinal beam.

According to the running gear for the maglev train in the present application, the circumferential wall of the longitudinal beam is provided with the slot for reducing the torsional rigidity of the longitudinal beam, which can reduce the torsional rigidity of the longitudinal beam made of the traditional aluminum profile, so as to reduce the coupling effect between the two suspension frames connected through the longitudinal beam, thereby greatly reducing the difficulty and the energy consumption of the suspension control.

It should be noted that setting the slot is mainly used to reduce the torsional rigidity of the longitudinal beam. During the processing, a certain simulation calculation can be performed to reduce the influence of the slot on the bending rigidity and strength of the longitudinal beam as much as possible.

Optionally, the slot is provided on a side wall of the longitudinal beam and is an axially symmetric slot in an axis of the side wall; and the slot includes two large hole portions and a narrow hole portion connecting the two large hole portions.

Optionally, the suspension frame includes multiple beams, ends of two adjacent beams are connected through a support beam; and the suspension frame further includes an air spring provided on the support beam and directly connected to the vehicle body.

Optionally, the running gear further includes an additional air chamber, and the additional air chamber is provided on the support beam, the air spring is mounted to the additional air chamber and an inter cavity of the air spring is in communication with the additional air chamber through an orifice.

Optionally, the running gear further includes multiple holding arms each in a C-shape. Upper ends of the holding arms are connected to ends of the beams, lower ends of the holding arms are configured to mount an electromagnet; and a skid is provided at a bottom of the support beam.

Optionally, the running gear further includes a mounting seat in an L shape. A side arm of the mounting seat is connected to the vehicle body, and a bottom arm of the mounting seat is located below the suspension frame; and a vertical stop is provided on a portion of the bottom arm opposite to the suspension frame and a vertical stop gap is provided between the vertical stop and the suspension frame.

Optionally, a lateral stop is provided on a portion of the side arm opposite to the suspension frame, and a lateral stop gap is provided between the lateral stop and the suspension frame.

Optionally, the suspension frames located at different positions of the vehicle body have different vertical stop gaps and lateral stop gaps.

Optionally, the running gear further includes a lateral damper having one end connected to the vehicle body and another end connected to the suspension frame; and the running gear further includes a vertical damper having one end connected to the vehicle body and another end connected to the suspension frame.

A maglev train is provided according to the present application, which includes multiple vehicle bodies. Multiple running gears are provided below each of the vehicle bodies, and the multiple running gears are the above running gears.

Since the above running gear has the above technical effects, the maglev train having the running gear also has similar technical effects, which will not be described herein.

REFERENCE NUMERALS IN FIGS. 1 TO 6

| 1   | suspension frame,      | 11   | beam,                |
|-----|------------------------|------|----------------------|
| 12  | support beam,          | 121  | skid,                |
| 122 | extension portion,     | 13   | air spring,          |
| 14  | additional air chamber,| 15   | holding arm,         |
| 16  | electromagnet,         | 17   | mounting seat,       |
| 171 | side arm,              | 171a | lateral stop,        |
| 172 | bottom arm,            | 172a | vertical stop,       |
| 18  | lateral damper,        | 19   | vertical damper;     |
| 2   | longitudinal beam,     | 21   | slot,                |
| 211 | large hole portion,    | 212  | narrow hole portion; |
| 3   | single pull rod,       | 4    | rail,                |
| 5   | vehicle body;          |      |                      |
| X   | lateral stop gap,      | Y    | vertical stop gap.   |

DETAILED DESCRIPTION

In order to make those skilled in the art to better understand the solution of the present application, the present application will be further described in detail below in conjunction with the accompanying drawings and specific embodiments.

The description "multiple" as used herein denotes to multiple uncertain quantities, usually two or more; and when "multiple" is used to indicate the number of members, it does not necessarily mean that the number of members is the same.

The descriptions of "lateral", "longitudinal", "upper" and "lower" as used herein denote to the orientation or positional relationship according to the orientation or positional relationship during the actual traveling of the train; and during the traveling of the train, the traveling direction is the longitudinal direction, and in the horizontal plane, the direction perpendicular to the longitudinal direction is a lateral direction, and in the vertical direction, the direction away from the ground is upper, and the direction close to the ground is lower.

Figure 1:
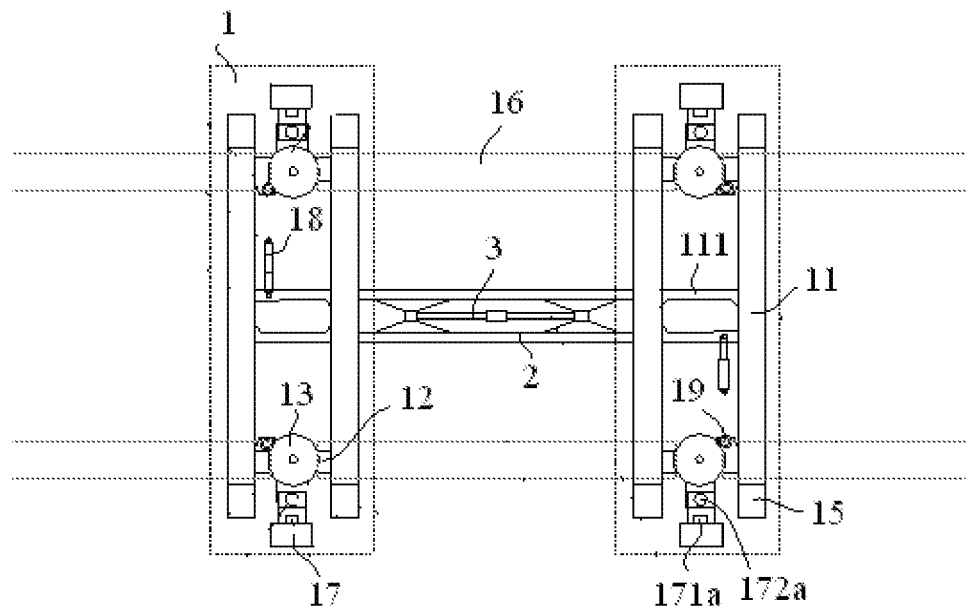
FIG. 1 is a schematic view showing the structure of a running gear for a maglev train according to an embodiment of the present application.
Figure 2:
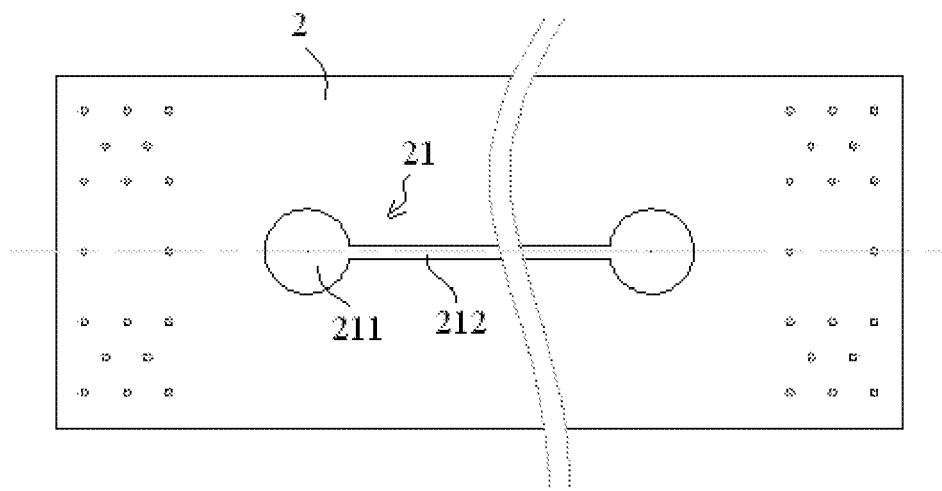
FIG. 2 is a lateral side view of a longitudinal beam in FIG. 1 according to an embodiment of the present application.
Figure 3:
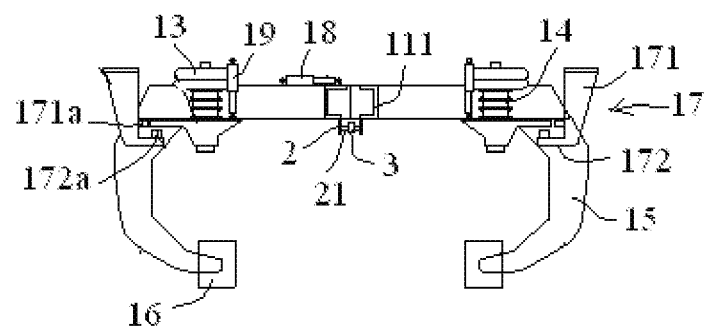
FIG. 3 is a side view of the running gear in FIG. 1.
Figure 4:
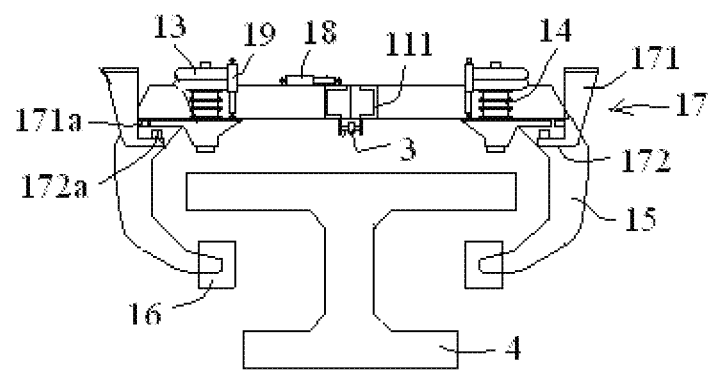
FIG. 4 is a schematic view showing the cooperation structure of the running gear and a rail in FIG. 1.
Figure 5:
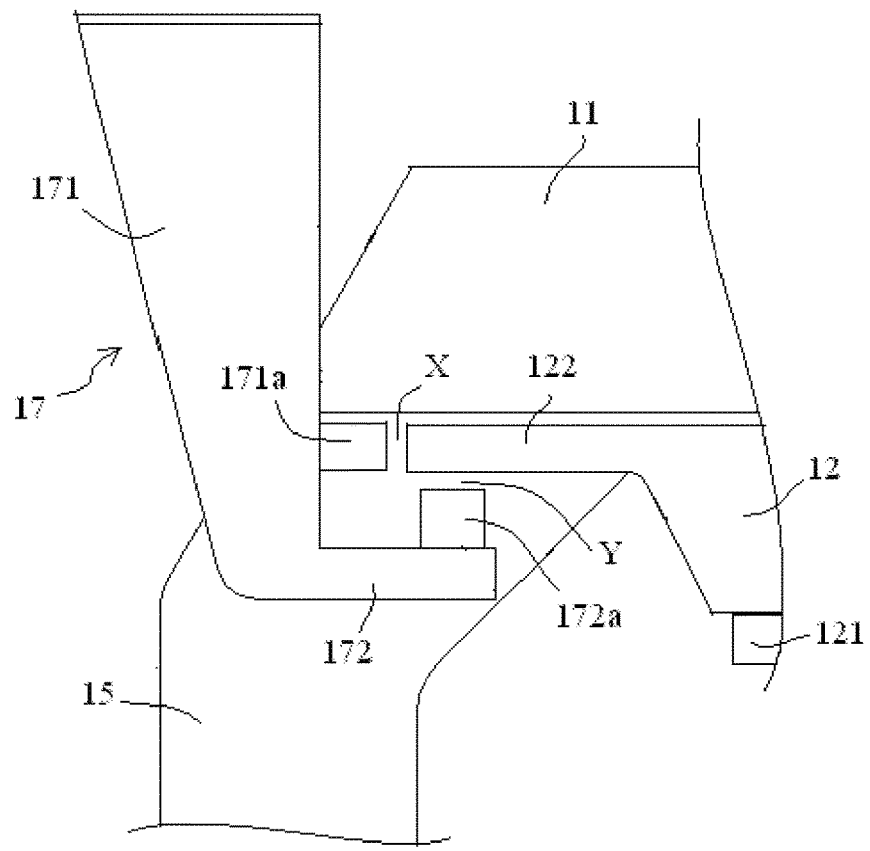
FIG. 5 is a partially enlarged view of the connection between a mounting seat and a suspension frame.
Figure 6:
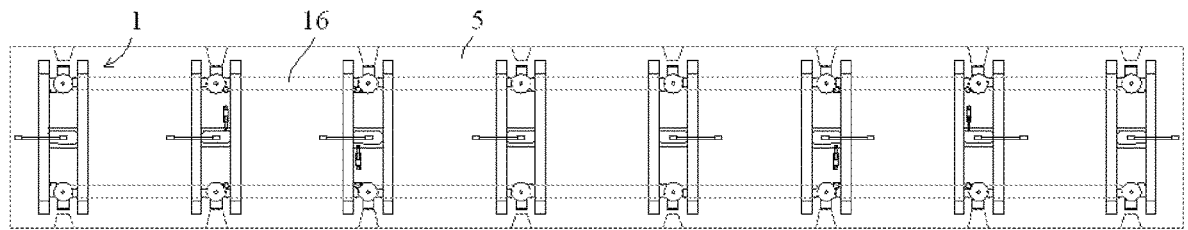
FIG. 6 is a schematic view showing the mounting structure of a running gear for a maglev train and a vehicle body according to the present application.

Referring to FIGS. 1 to 6, FIG. 1 is a schematic view showing the structure of a running gear for a maglev train according to an embodiment of the present application; FIG. 2 is a lateral side view of the longitudinal beam in FIG. 1; FIG. 3 is a side view of the running gear in FIG. 1; FIG. 4 is a schematic view showing the cooperation structure of the running gear and a rail in FIG. 1; FIG. 5 is a partially enlarged view of the connection between a mounting seat and a suspension frame; and FIG. 6 is a schematic view showing the mounting structure of a running gear for the maglev train and a vehicle body according to the present application.

As shown in FIG. 1, a running gear for a maglev train is provided according to the present application, which includes two suspension frames 1 spaced apart in a traveling direction, two suspension frames 1 are connected through a longitudinal beam 2, and a pulling rod 3, specifically in a Z-shape, for connecting the longitudinal beam 2 and a vehicle body 5 of the maglev train.

The longitudinal beam 2 can be specifically prepared from an aluminum alloy extruded profile. Difference from the conventional technology, a circumferential wall of the longitudinal beam 2 is further provided with a slot 21 for reducing the torsional rigidity of the longitudinal beam 2, which can reduce the torsional rigidity of the longitudinal beam 2 made of the traditional aluminum profile, so as to reduce the coupling effect between the two suspension frames 1 connected through the longitudinal beam 2, thereby greatly reducing the difficulty and the energy consumption of the suspension control.

It should be noted that setting the slot 21 is mainly used to reduce the torsional rigidity of the longitudinal beam 2. During the processing, a certain simulation calculation can be performed to reduce the influence of the slot 21 on the bending rigidity and strength of the longitudinal beam 2 as much as possible.

In addition, according to the embodiment of the present application, it is not limited to how much setting the slot 21 can reduce the torsional rigidity of the longitudinal beam 2. In the implementation, the person skilled in the art can determine the degree of torsion rigidity of the longitudinal beam 2 according to different vehicle models and the structure of the suspension frames 1 through a certain simulation calculation, and then a slot 21 with a corresponding number, corresponding size and corresponding shape can be provided at a corresponding position of the circumference wall of the longitudinal beam 2.

In other words, the specific shape, number, and size of the slot 21 are not explicitly defined according to the embodiment of the present application, which can be set according to the requirements for use in practical application.

However, in order to make the solution of the present application more clear, a slot 21 in a specific shape is provided according to the embodiment of the present application, as an exemplary description, referring to FIG. 2.

As shown in FIG. 2, the above slot 21 may be provided on a side wall of the longitudinal beam 2, and specifically may be provided on two side walls in a lateral direction of the longitudinal beam 2 to avoid affecting the mounting of the pulling rod 3.

The slot 21 may be an axially symmetric slot in an axis of the side wall, as viewed in FIG. 2, the axis may include a vertical axis and a horizontal axis, that is, the slot 21 is an axisymmetric structure with respect to the vertical axis and the horizontal axis. Thus, on the longitudinal beam 2, two points which are the same distance from the center position of the longitudinal beam 2 (an intersection of the vertical axis and the horizontal axis) may have the same torsional rigidity.

Specifically, the slot 21 may include two large hole portions 211 and a narrow hole portion 212 connecting the two large hole portion 211. The two large hole portions 211 may be provided near both ends of the longitudinal beam 2, that is, the slot 21 is a bone-like structure having two large ends and a thin middle portion.

With this structure, the slot 21 near the center of the longitudinal beam 2 has a narrow hole, which is relatively small and has a small degree of reduction in the torsional rigidity of the longitudinal beam 2, and the slot 21 away from the center of the longitudinal beam 2 has a large hole, which has a large degree of reduction in the torsional rigidity of the longitudinal beam 2. That is, a longitudinal beam 2 having a large central torsional rigidity and a small end torsional rigidity is formed.

More specifically, each of the large hole portions 211 may be a circular hole to allow the circumferential force of each of the large hole portions 211 to be more balanced.

It should be noted that the above description of the specific shape and structure of the slot 21 from the view of FIG. 2 is merely an exemplary description, and cannot be used as a limitation on the specific structure of the slot 21, and the slot 21 may be other shapes as long as the requirements for use are met.

Referring to FIG. 1, each of the suspension frames 1 may include multiple beams 11, which may generally be two beams 11. The middle portions of the two beams 11 may be connected by a connecting member 111, and ends of the two beams 11 may be connected by the support beam 12, so as to ensure connecting reliability between the two beams 11.

It should be understood that in the field of maglev trains, the suspension frame 1 and the vehicle body 5 are both connected by a secondary suspension structure, and the secondary suspension structure in the conventional technology usually includes a boom, a bolster, and a shear spring, and the structure is extremely complex, and mounting, service and maintenance are more difficult, and the secondary suspension structure in the conventional technology also causes a large weight of the running gear and a high running cost for the train.

In view of this, a specially designed air spring 13 is adopted to connect the running gear and the vehicle body 5 according to an embodiment of the present application, and the traditional boom, bolster, and shear springs are not required, which can greatly simplify the secondary suspension structure and effectively reduce the overall weight of the running gear, thereby reducing the service, maintenance and operating costs of the train.

The air spring 13 may be provided on the support beam 12, or other position of the suspension frame 1, and is connected to the vehicle body 5. Due to the special design, it has a larger vertical and horizontal displacement compared with the ordinary air spring, which can effectively reduce the amount of vertical misalignment and horizontal misalignment between the vehicle body 5 and the running gear when the train travels in the horizontal curve and the vertical curve, thereby improving the operation of the train.

Further, the running gear further includes an additional air chamber 14. The additional air chamber 14 may be provided on the support beam 12, the air spring 13 may be mounted to the additional air chamber 14, and an inter cavity of the air spring 13 is in communication with the additional air chamber 14 through an orifice.

When the air spring 13 is stretched, gas in the additional air chamber 14 can be replenished to the inner cavity of the air spring 13, and when the air spring 13 is compressed, the gas in the air spring 13 may be introduced into the additional air chamber 14.

Moreover, since the gas exchange between the air spring 13 and the additional air chamber 14 is completed through the orifice and the aperture of the orifice is relatively small, the gas exchange between the two is not "smooth", that is, the gas is damped during the process of filling or exhausting the gas into the inner cavity of the air spring 13, so as to hinder the stretching or compression of the air spring 13. In fact, the process of hindering the stretching or compression of the air spring 13 can be used for the vertical damping of the train running at a high speed in a complicated curve, thereby realizing the rapid attenuation of the vertical vibration of the vehicle body 5, and improving the smoothness and the comfort during the running process of the train.

It can be understood that the damping generated by the above orifice has a relatively limited ability to relieve the vertical vibration. If the vertical or lateral vibration of the vehicle body 5 is large, a dedicated lateral damper 18 and a dedicated vertical damper 19 may be provided to better alleviate and eliminate the lateral and vertical of the vehicle body 5 when the vehicle travels in a complicated curve. The vibration damper may specifically be a hydraulic damper, an active or semi-active damper.

In fact, during the traveling of the train, the vertical and lateral vibrations generated at different positions, such as the two ends of the head and tail and the middle portion of the vehicle body 5, are different. Therefore, for the suspension frame 1 mounted at different positions of the vehicle body 5, it may have different vibration mitigation capabilities.

Specifically, in FIG. 6, in the conventional technology, 4 running gears are generally provided below the vehicle body 5, that is, 8 suspension frames 1 are included. For convenience of description, the suspension frames 1 may be numbered, each of the suspension frames 1 may be denotes as a suspension frame No. 1 to 8 in a left-to-right direction.

Considering the convenience of mounting and the requirement for vibration attenuation, the above lateral damper 18 and vertical damper 19 can be provided only in the suspension frames No. 2, No. 3, No. 6, and No. 7; of course, in practical, the above damper may be mounted in the suspension frame 1 at another position, regardless of where it is located, as long as the specific effect can be generated.

In addition, when designing, one lateral damper 18 and one vertical damper 19 may be provided, or, multiple lateral dampers 18 and multiple vertical dampers 19 are provided, so as to buffer the vibration of the vehicle body 5 of different degrees.

In FIG. 1, the lateral damper 18 has one end fixed to the connecting member 111 and the other end connected to the vehicle body 5, and two lateral dampers 18 may be provided, which are respectively provided in the two suspension frames 1 of the running gear; the two lateral dampers 18 may be respectively located on both sides of the longitudinal axis of the running gear, and are respectively connected to the left half portion and the right half portion of the vehicle body 5 in the lateral direction so as to better balance the lateral vibration of the vehicle body 5.

Four vertical dampers 19 may be are respectively provided on the respective support beams 12 to uniformly withstand the vertical vibration of the bottom of the vehicle body 5.

As shown in FIGS. 3 and 4, the running gear according to the present application further includes multiple holding arms 15 each in a C shape. Upper ends of the holding arms 15 are connected to ends of the beams 11, lower ends of the holding arms 15 are configured to mount an electromagnet 16, which cooperate with an electromagnet provided on the rail 4 to generate a suspension force, a guiding force, and a braking force for the train to run and brake.

The bottom of the support beam 12 may be provided with a skid 121. When the train is powered off, the vehicle body 5 may be supported on the rail 4 through the skid 121 provided on each running gear; and when an electrical fault occurs, the skid 121 may also be used for the train to emergently brake.

For each of the above solutions, the running gear according to the embodiment of the present application may further be provided with a vertical stop and a lateral stop to avoid excessive lateral displacement and vertical displacement of the vehicle body 5 during the traveling of the train, which may otherwise cause the vehicle body 5 to be rolled over and turned over.

Specifically, as shown in FIG. 5 and in conjunction with FIGS. 3 and 4, the running gear may further include a mounting seat 17 in an L-shape. An upper end of a side arm of the mounting seat 17 is connected to the vehicle body 5, and a bottom arm 172 of the mounting seat 17 is located below the suspension frame 1.

In detail, the support beam 12 may have an extension portion 122 extended outward in the lateral direction, the bottom arm 172 can be located below the extension portion 122, a vertical stop 172a may be provided at the position of the bottom arm 172 opposite the extension portion 122, and a vertical stop gap Y may be provided between the upper end surface of the vertical stop 172a and the lower end surface of the extension portion 122; a lateral stop 171a may be provided at the position of the side arm 171 opposite to the extension portion 122, and a lateral stop gap X may be provided between the right end surface of the lateral stop 171a and the left end surface of the extension portion 122.

During the traveling of the train, when the lateral displacement amount and/or the vertical displacement amount of the vehicle body 5 are large, the lateral stop 171a and the vertical stop 172a provided on the mounting seat 17 can abut against the support beam 12 to avoid the lateral displacement amount and/or the vertical displacement amount of the vehicle body 5 to further increase, thereby further avoiding the risk of rollover during the traveling of the train.

In addition, according to the difference of the position of the suspension frame 1 mounted on the vehicle body 5, the above lateral stop gap X and vertical stop gap Y may be different. Generally speaking, the lateral and vertical displacement between the suspension frame 1 and the vehicle body 5 near the two ends and the middle portion of the vehicle body 5 is large, thus the lateral stop gap X and the vertical stop gap Y of the running gear may be appropriately increased, so as to prevent the lateral stop 171a and the vertical stop 172a from excessively colliding with the support beam 12, which may result in damage to the running gear.

More specifically, as shown in FIG. 6, during the traveling of the train, the above suspension frames No. 1, No. 4, No. 5, and No. 8 can generate a relatively large lateral displacement amount and vertical displacement amount with the vehicle body 5, and then the lateral stop gap X and the vertical stop gap Y can be appropriately increased. Specifically, the lateral stop gap X can be set to 70 to 90 mm, and the vertical stop gap Y can be set to 60 to 80 mm; and the above suspension frames No. 2, No. 3, No. 5 and No. 6 can generate a relatively small lateral displacement amount and vertical displacement amount with the vehicle body 5, and then the lateral stop gap X and the vertical stop gap Y can be appropriately reduced. Specifically, the lateral stop gap X can be set to 0, and the vertical stop gap Y can be set to 30 to 50 mm.

In this way, the lateral stop gap X and the vertical stop gap Y of the suspension frame 1 at different mounting positions can be adjusted in a targeted manner, thereby effectively preventing the rollover phenomenon of the vehicle body 5 during the traveling of the train, and at the same time, effectively preventing the situation that the stop member is excessively collided with the suspension frame 1, which may result in damage to the running gear.

A maglev train is further provided according to the present application, which includes multiple vehicle bodies 5, multiple running gears are provided below each of the vehicle body 5, and the multiple running gears are the running gears in the above embodiments.

Since the above running gear has the above technical effects, the maglev train having the running gear also has similar technical effects, which will not be described herein.

Only preferred embodiments of the present application are described above. It should be noted that, for the person skilled in the art, a few of modifications and improvements may be made to the present application without departing from the principle of the present application, and these modifications and improvements are also deemed to fall into the scope of the present application defined by the claims.

What is claimed is:

1. A running gear for a maglev train, comprising:
two suspension frames spaced apart in a traveling direction, wherein the two suspension frames are connected through a longitudinal beam, and a slot for reducing a torsional rigidity of the longitudinal beam is provided on a circumferential wall of the longitudinal beam;
a pulling rod for connecting the longitudinal beam and a vehicle body of the maglev train,
a mounting seat in an L-shape, wherein a side arm of the mounting seat is connected to the vehicle body, and a bottom arm of the mounting seat is located below the suspension frame; and a vertical stop is provided on a portion of the bottom arm opposite to the suspension frame and a vertical stop gap is provided between the vertical stop and the suspension frame.

2. The running gear for the maglev train according to claim 1, wherein the slot is provided on a side wall of the longitudinal beam and is an axially symmetric slot in an axis of the side wall; and
the slot comprises two large hole portions and a narrow hole portion connecting the two large hole portions.

3. The running gear for the maglev train according to claim 2, further comprising a mounting seat in an L-shape, wherein a side arm of the mounting seat is connected to the vehicle body, and a bottom arm of the mounting seat is located below the suspension frame; and
a vertical stop is provided on a portion of the bottom arm opposite to the suspension frame and a vertical stop gap is provided between the vertical stop and the suspension frame.

4. A maglev train, comprising a plurality of vehicle bodies, wherein a plurality of running gears according to claim 2 is provided below each of the plurality of vehicle bodies.

5. The running gear for the maglev train according to claim 1, wherein each of the two suspension frames comprises a plurality of beams, ends of two adjacent beams are connected through a support beam; and
the suspension frame further comprises an air spring provided on the support beam and directly connected to the vehicle body.

6. The running gear for the maglev train according to claim 5, further comprising an additional air chamber, wherein the additional air chamber is provided on the support beam, the air spring is mounted to the additional air chamber and an inter cavity of the air spring is in communication with the additional air chamber through an orifice.

7. The running gear for the maglev train according to claim 6, further comprising a mounting seat in an L-shape, wherein a side arm of the mounting seat is connected to the vehicle body, and a bottom arm of the mounting seat is located below the suspension frame; and a vertical stop is provided on a portion of the bottom arm opposite to the suspension frame and a vertical stop gap is provided between the vertical stop and the suspension frame.

8. A maglev train, comprising a plurality of vehicle bodies, wherein a plurality of running gears according to claim 6 is provided below each of the plurality of vehicle bodies.

9. The running gear for the maglev train according to claim 5, further comprising a plurality of holding arms each in a C-shape, wherein upper ends of the plurality of holding arms are connected to ends of the plurality of beams, lower ends of the plurality of holding arms are configured to mount an electromagnet; and a skid is provided at a bottom of the support beam.

10. The running gear for the maglev train according to claim 9, further comprising a mounting seat in an L-shape, wherein a side arm of the mounting seat is connected to the vehicle body, and a bottom arm of the mounting seat is located below the suspension frame; and a vertical stop is provided on a portion of the bottom arm opposite to the suspension frame and a vertical stop gap is provided between the vertical stop and the suspension frame.

11. A maglev train, comprising a plurality of vehicle bodies, wherein a plurality of running gears according to claim 9 is provided below each of the plurality of vehicle bodies.

12. The running gear for the maglev train according to claim 5, further comprising a mounting seat in an L-shape, wherein a side arm of the mounting seat is connected to the vehicle body, and a bottom arm of the mounting seat is located below the suspension frame; and a vertical stop is provided on a portion of the bottom arm opposite to the suspension frame and a vertical stop gap is provided between the vertical stop and the suspension frame.

13. A maglev train, comprising a plurality of vehicle bodies, wherein a plurality of running gears according to claim 5 is provided below each of the plurality of vehicle bodies.

14. The running gear for the maglev train according to claim 1, wherein a lateral stop is provided on a portion of the side arm opposite to the suspension frame, and a lateral stop gap is provided between the lateral stop and the suspension frame.

15. The running gear for the maglev train according to claim 14, wherein the suspension frames located at different positions of the vehicle body have different vertical stop gaps and lateral stop gaps.

16. A maglev train, comprising a plurality of vehicle bodies, wherein a plurality of running gears according to claim 14 is provided below each of the plurality of vehicle bodies.

17. The running gear for the maglev train according to claim 1, further comprising a lateral damper having one end connected to the vehicle body and another end connected to the suspension frame; and further comprising a vertical damper having one end connected to the vehicle body and another end connected to the suspension frame.

18. A maglev train, comprising a plurality of vehicle bodies, wherein a plurality of running gears according to claim 1 is provided below each of the plurality of vehicle bodies.

* * * * *